United States Patent
Atamel (10) Patent No.: US 8,751,689 B2
(45) Date of Patent: Jun. 10, 2014

(54) SERIALIZATION AND DISTRIBUTION OF SERIALIZED CONTENT USING SOCKET-BASED COMMUNICATION

(75) Inventor: Mete Atamel, London (GB)

(73) Assignee: Adobe Systems Incorporated, San Jose, CA (US)

( * ) Notice: Subject to any disclaimer, the term of this patent is extended or adjusted under 35 U.S.C. 154(b) by 110 days.

(21) Appl. No.: 13/170,956

(22) Filed: Jun. 28, 2011

(65) Prior Publication Data

US 2013/0318148 A1 Nov. 28, 2013

(51) Int. Cl.
G06F 15/16 (2006.01)

(52) U.S. Cl.
USPC .......................................... 709/247

(58) Field of Classification Search
USPC .......................... 709/203, 246–247
See application file for complete search history.

(56) References Cited

U.S. PATENT DOCUMENTS

| | | | |
|---|---|---|---|
| 2006/0047780 A1* | 3/2006 | Patnude | 709/219 |
| 2006/0069746 A1* | 3/2006 | Davis et al. | 709/218 |
| 2007/0050838 A1* | 3/2007 | Liu et al. | 726/3 |
| 2008/0222266 A1* | 9/2008 | Banerjee et al. | 709/208 |

OTHER PUBLICATIONS

Newton's Telecom Dictionary, 18th ed., Feb. 2002.*

* cited by examiner

*Primary Examiner* — Brendan Higa
(74) *Attorney, Agent, or Firm* — Kilpatrick Townsend & Stockton LLP (57) ABSTRACT

One illustrative embodiment involves executing one or more script-based libraries to serialize an object comprising content that is displayed on a web page in a web browser on a client device. The serialization comprises identifying a string representing raw bytes that identify the object. The embodiment also involves establishing a connection between the client device and a server device, wherein the connection is a full duplex communication channel for communication between the client device and the server device. The embodiment further involves sending, from the client device, the serialized object over the full duplex communication channel to the server device and receiving the serialized object from the server device. The serialized object from the server device is serialized according to the string representing raw bytes. The embodiment further involves deserializing the object from the server device.

20 Claims, 5 Drawing Sheets

SERIALIZATION AND DISTRIBUTION OF SERIALIZED CONTENT USING SOCKET-BASED COMMUNICATION

TECHNICAL FIELD

Embodiments relate generally to socket-based communication between a client and server and more particularly to the serialization and distribution of web page content over a full duplex communication channel by web page program code.

BACKGROUND

New standards for web-based communication are providing improved ways to distribute web page content between a client and a server. System integrators and developers desire to leverage these new standards to realize the benefits of bi-directional, full duplex communication between a web browser and web server. Full duplex communication enables a client and server to simultaneously send and receive messages between each other. Such communication offers a distinct advantage over existing web-based communication protocols, such as Hypertext Transfer Protocol (HTTP), which involves opening and closing a connection in conjunction with each request for information from a client to a server. Such communication restricts simultaneous communication and introduces latency. Contrast this with full duplex communication in which a channel remains open after it is established therefore allowing two-way communication to occur with minimal latency.

Full duplex communication can be socket-based. Socket-based communication enables content to be sent and received between a client and server over a single Transmission Control Protocol (TCP) socket. An example of socket-based communication is the WebSocket protocol. The WebSocket protocol, which is being developed as part of the Hypertext Markup Language (HTML) 5 standard, enables full duplex communication between a web browser and a web server to send and receive web page content over a WebSocket channel. To enable faster and more efficient distribution of web content over a full duplex communication channel, it is desirable to serialize the web content. Certain serialization formats such as ActionScript Message Format (AMF), however, are not presently available for web page content that is defined by certain script-based code, such as JavaScript.

SUMMARY

One illustrative embodiment involves executing one or more script-based libraries to serialize an object comprising content that is displayed on a web page in a web browser on a client device. The serialization comprises identifying a string representing raw bytes that identify the object. The embodiment also involves establishing a connection between the client device and a server device, wherein the connection is a full duplex communication channel for communication between the client device and the server device. The embodiment further involves sending, from the client device, the serialized object over the full duplex communication channel to the server device and receiving the serialized object from the server device. The serialized object from the server device is serialized according to the string representing raw bytes. The embodiment further involves deserializing the object from the server device. The script-based libraries are accessed by script-based code for defining the web page, and the script-based code displays the content in the object from the server device on the web page.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Embodiments herein relate to using program code for web pages to serialize web page content and communicate the serialized content over a full duplex communication channel. A full duplex communication channel allows simultaneous, two-way communication between a client and a server such that both the client and the server can send and receive messages without waiting for a request from the other to communicate. Certain embodiments herein relate to full duplex communication using a socket channel, i.e., socket-based communication, and more particularly relate to communication over a WebSocket channel. A WebSocket channel can be used to connect a web browser to a web server and to distribute web page content and other messages between the client and server. The web page content can be serialized using various serialization techniques that enable efficient distribution of the content over a socket channel. In one embodiment, JavaScript code can serialize an object in AMF and distribute the AMF serialized object over a WebSocket channel to a server device. The server device can receive the serialized object, deserialize it, update the contents of the object, serialize the updated object, and send the updated object back to the client device where its contents can be displayed on a web page.

Embodiments herein leverage the benefits of AMF serialization and full duplex communication by extending such benefits to web page developers and users, for whom the benefits were previously unavailable. To achieve this, script-based libraries can be installed and used by JavaScript code to serialize content displayed on web pages in AMF and communicate the content over a full duplex communication channel. A WebSocket channel is a particularly attractive full duplex communication channel in part because of its integration with JavaScript program code. As a result of combining serialization with full duplex communication for web page content, users of web pages can experience more timely and reliable updates to web pages on which they depend for information, as an example. Embodiments herein related to the above functionality will be described in greater detail in the following paragraphs.

In an exemplary embodiment, script-based code, such as JavaScript, can utilize a socket channel to send web page content to the server. The script-based code can also serialize the content before sending the content over the socket channel. By serializing content, data objects and structures can be translated into a format that enables the content to be communicated faster and more efficiently than it would be communicated in its original format. For example, data objects can be represented as binary data, e.g., a byte array of 0's and 1's, instead of strings, to enable the faster, more efficient communication. In an exemplary embodiment, content can be serialized in this way in AMF. AMF serialization offers a further benefit which enables content to be identified by a reference. A reference, which can have a significantly smaller byte size than the actual content, can be sent over a communication channel instead of the content each time communication associated with the content is required. Such functionality can reduce network utilization and latency, as examples.

In one embodiment, serialization and communication of serialized content can be performed by one or more script-based libraries. An application developer can install the libraries on a client device to gain access to their functionality. In one embodiment, the script-based libraries can be accessed from script-based code. For example, script-based code that defines a web page can use the script-based libraries to perform various functions related to communicating serialized content. For example, a script-based library can communicate with an application programming interface (API) associated with a socket channel to perform functions related to communicating content between a client and server. The same or another script-based library can serialize and deserialize content sent between a client and server. In one embodiment, the library encompasses the functionality of the socket API and performs a number of other functions associated with socket communication to make relevant details of the communication transparent to a code developer. For example, when a developer codes a "send message" or equivalent command to send a message over a socket channel, the script-based library can serialize web page content for distribution before calling a socket API command to send the serialized object to the server. Thus, the "send message" command can perform each of the underlying details associated with sending content over a socket, therefore relieving the code developer of performing such details.

In one embodiment, serialization of web page content by a script-code library can involve serializing the content in a string of Unicode characters that correspond to bytes of the content. The WebSocket API, for example, requires that content be formatted to Universal Character Set Transformation Format—8-bit (UTF8) in order to send the content across the web socket channel. Where the script-based libraries, such as those developed for use with the JavaScript programming language, do not have access to binary data but have access to the Unicode character set, the libraries can instead serialize content in Unicode for communicating over a WebSocket channel or another socket channel. In one exemplary embodiment, JavaScript libraries provide a bridge between JavaScript objects and AMF such that the Unicode representation of JavaScript objects can be interpreted by a server that understands AMF. In this way, embodiments provide a way for JavaScript applications to communicate with servers configured to receive AMF data.

A server can receive and deserialize content. As a specific example, a server can update the content in a deserialized object with current information and send a serialized object containing the updated information back to the client device that requested the updated information. Script-based libraries can listen for updates from the server, receive the updates, deserialize them, and display them on a web page.

In one embodiment, to utilize the benefits of AMF and a socket channel, a user can install the above described JavaScript libraries and a web browser that supports the WebSocket protocol on a client device. The user can thereafter receive updates for requested information at a device. For example, a stock trader can receive real-time updates of stock information. A user may request real-time stock information by clicking on a link associated with such functionality on a web page defined by JavaScript code. The JavaScript code can access an object containing, for example, stock name, ticker symbol, last known price, trading volume, day high and low, and other stock related information subject to change during a trading day. The JavaScript libraries can serialize the object and send it to a socket channel as described above. A server can receive the serialized object, deserialize it, perform functions to update variables in the object with the most recent stock information, for example, and send a serialized object containing the updated stock information back to the user's client device where it can be deserialized and its contents displayed on a web page.

In another example, a person object containing various information about online shoppers, for example, can be updated. Elements in the person object can include buyer name, street address, purchase history, and items of interest. When items of interest are identified, for example, the items can be added to the object at the server side, serialized, and sent to a requesting client device where the updated contents of the object can be displayed. Objects containing various other information may be updated in similar fashion in other embodiments.

While one embodiment relates to JavaScript code, WebSocket channels, and AMF, similar functionality provided by other program code, applications, and protocols may also be the subject of embodiments herein. Thus, JavaScript, AMF, and WebSocket are mentioned only by way of illustration and are not meant to limit embodiments herein. For example, HTML, Perl, or other client-side programming languages may be used instead of JavaScript. Similarly, serialization techniques other than AMF may be used. Such techniques can be implemented by client-side programs, and support for deserializing content serialized according to such techniques can be installed at a server that is listening for information in the serialized format. Furthermore, a full duplex communication channel other than a WebSocket channel can be used. Communication may also be conducted over a communication channel that does not involve web-based communication, e.g., a web browser and a web server, but may involve any client or server application.

Figure 1:
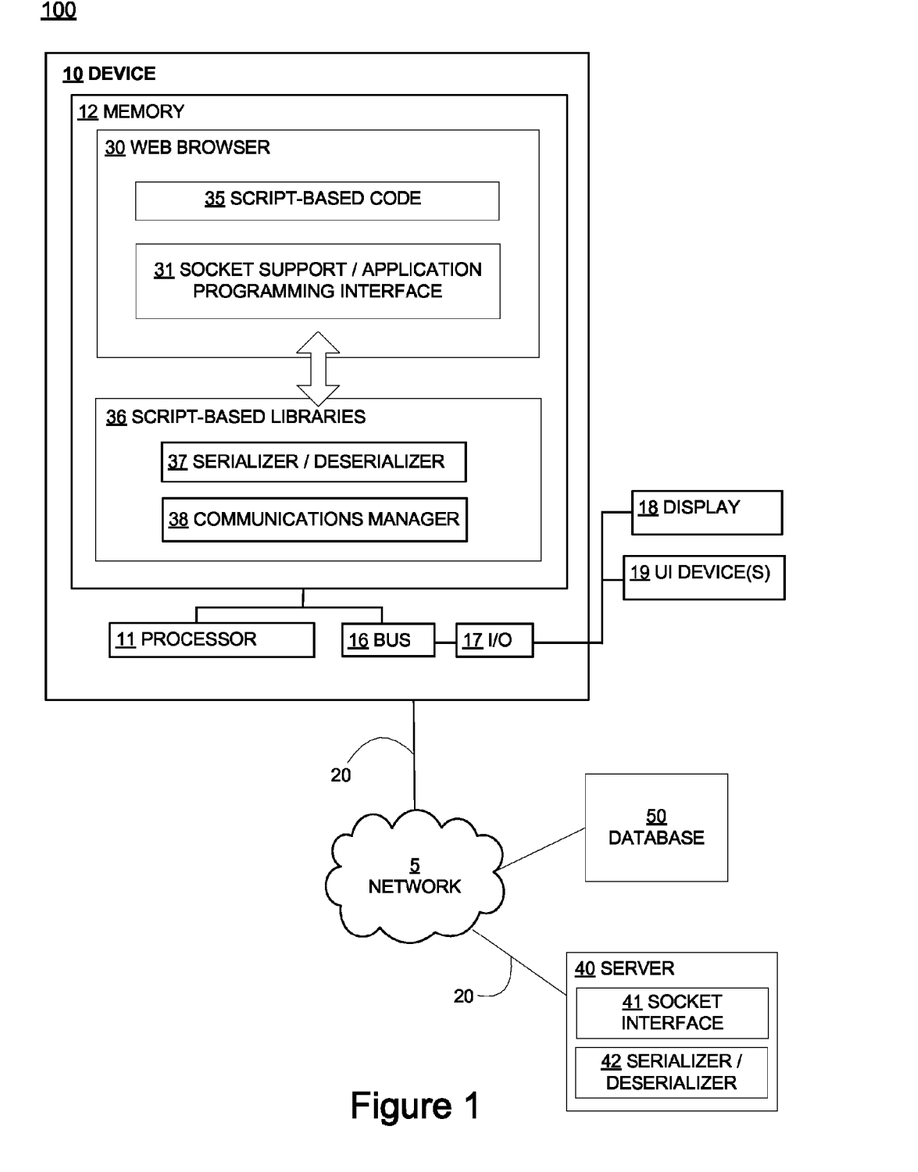
FIG. 1 depicts an exemplary computing environment for serializing and distributing serialized content by script-based code for web pages over a full duplex communication channel.

FIG. 1 depicts an exemplary computing environment for serializing and distributing serialized content by script-based code for web pages over a full duplex communication channel. The methods and systems disclosed herein are also applicable to other computing systems and environments. The environment shown in FIG. 1 comprises a wired or wireless network 5 to which various devices, specifically client device 10, server device 40, and database 50, are connected. In other embodiments, other networks, intranets, or combinations of networks may be used. Other embodiments do not involve a network and may, for example, provide features on a single device or on devices that are directly connected to one another, e.g., client device 10 may be directly connected to the server device 40. Other alternative networks, computers, and electronic device configurations are also possible. In one configuration, the database 50 can store content that is the subject of present embodiments for accessing by the client device 10 and the server device 40. Only one database 50 is shown but many more databases for storing content may exist. The database 50 can also be located at the client device 10 or the server device 40 instead of on the network 5. Full duplex communication, e.g., over a socket channel, can occur between the client device 10 and the server device 40 over connection 20, in one configuration.

As used herein, the term "device" refers to any computing or other electronic equipment that executes instructions and includes any type of processor-based equipment that operates an operating system or otherwise executes instructions. A device will typically include a processor 11 (shown in FIG. 1) that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. A "remote device" refers to a device that is located externally to another device, such as on the network 5. An example of a remote device is a computer server.

The exemplary client device 10 is used as a special purpose computing device to provide specific functionality offered by its applications. As an example, client device 10 is illustrated in FIG. 1 with a display 18 and various user interface devices 19. A bus, such as bus 16, will typically be included in a device such as the client device 10.

As used herein, the term "socket" refers to bi-directional, full duplex communications that occur on a single connection over which content can be sent between devices, e.g., the client device 10 and the server device 40. Such communication can occur over a channel, e.g., a socket channel. An exemplary socket channel is a WebSocket channel, which enables the distribution of web page content between a web browser and a web server using the WebSocket protocol. Support for the Websocket protocol is currently being implemented as part of the HTML 5 initiative and includes a JavaScript interface to enable the JavaScript programming language to interact with a WebSocket channel via an API. The API can include one or more functions that can be used by JavaScript and other script-based code to enable web pages to communicate with a server configured to receive content over a WebSocket channel. Web browsers, such as Google Chrome® and Firefox®, provide support for WebSocket communication. The term "socket" is not meant to be limited to a particular type of socket, such as a WebSocket. A "socket" may refer more generally to socket-based communication between a web browser and a web server and additionally or alternatively may refer to communication between any client or server application.

As used herein, the terms "script-based code" and "program code for web pages" refer to computer program code that can run in a web browser to provide user interfaces. A "script-based library" is a collection of resources, e.g., functions, subroutines, values, that can be used by the script-based code to provide specific functionality. Examples of script-based code include HTML, JavaScript, Extensible Markup Language (XML), and Perl.

As used herein, an "object" refers to an entity that can be manipulated by commands of script-based code. An object can include a number of values, variables, and methods or functions such that the content described herein may be stored in an object. For example, an object herein can contain values and methods associated with related content, e.g., content associated with stock information and person objects as described above. In one embodiment, a server can execute the methods in an object to update the associated variables therein. The objects can therefore exhibit control over at least some of the functions performed by the server with regard to updating information sent from a client device. For example, a method can instruct a server regarding how to access the content that requires updating, the frequency at which the updates should be provided, and the duration for providing the updates. Content other than that located within an object can also be serialized and distributed to a server over a full duplex communication channel.

The term "content" is referred to as such because it may be displayed on a web page or associated with text, images, or other information this is displayed on a web page. "Content" herein can be used interchangeably with "data" and "information."

"Serialization" herein refers to the process of converting an object into a series of bytes that can be communicated between a client and server and returned to its original form when the series of bytes are reread according to the serialization format. "Deserialization" refers to returning the serialized bytes to their original object form. An exemplary serialization format herein is AMF. AMF is a binary format used to serialize ActionScript objects and may be used as the underlying format by script-based code for web pages to serialize objects associated with such program code, e.g., JavaScript objects. Particularly, a JavaScript object can be formatted as a string of Unicode characters that corresponds to the binary format created by AMF.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, flash memory, or any other medium from which a computer processor can read instructions. The instructions may comprise processor-specific instructions generated by a compiler and/or an interpreter from code written in any suitable computer-programming language, including, for example, JavaScript, ActionScript, Java, Perl, C, C++, C#, Visual Basic, and Python.

In FIG. 1, client device 10 comprises a memory 12 that contains a web browser 30. The web browser 30 can include support for a socket channel, such as a WebSocket channel, via a socket API 31 to allow script-based code to communicate with the socket channel. The web browser 30 can also include script-based code 35 that can define a web page in the web browser. Defining a web page can mean creating a user interface comprised of various content and components that allow a user to view and interact with the web page.

The memory 12 can also include script-based code libraries 36 that can be used with the script-based code 35 to provide specific functionality. For example, the serializer 37 can serialize and deserialize content displayed on a web page in the web browser 30. The communication manager 38 can communicate with the socket channel to send serialized data to the server device 40 and receive updates from the server device 40. The server device 40 can be configured for communication with a socket channel and can include functionality that is similar to that provided on the client device 10. For example, a socket interface 41 can be used to communicate with a socket channel to receive and send serialized content. The server device 40 can also include a serializer 42 that is capable of serializing and deserializing objects according to the format received from the client device 10.

Figure 2:
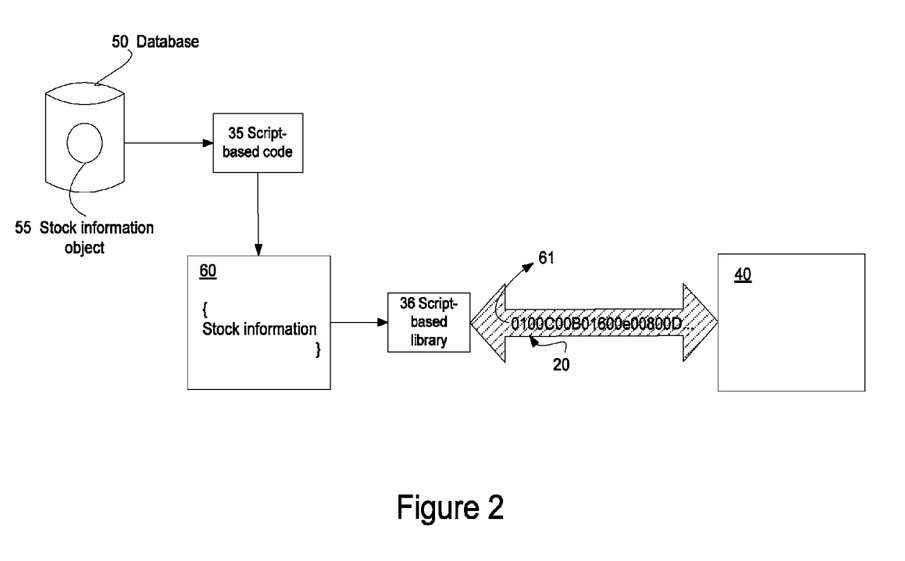
FIG. 2 is a diagram illustrating the flow of content in the exemplary computing environment of FIG. 1.

FIG. 2 is a diagram illustrating the flow of content in the exemplary computing environment of FIG. 1. For example, a web page 60 in the web browser 30 (shown in FIG. 1) can display stock information belonging to a stock information object 55. In one embodiment, the script-based code 35 can access the database 50 to retrieve the stock information object 55 and display its content on web page 60, i.e., to define the web page. The script-based code 35 can also call a function in the script-based code library 36, e.g., the serializer 37, to serialize the stock information into Unicode format 61. Each Unicode character can correspond to a byte of the content. In one embodiment, the serializer 37 can convert the stock information object 55 to AMF. Subsequently, the serializer 37 can associate each byte with its Unicode equivalent to finalize the serialization. Other serialization formats and/or techniques may be used in other embodiments. For example, the script-based code 35 may be able to serialize objects to a byte format in a future embodiment.

The script-based code 35 can also call a function in the communication manager 38 to send the serialized content over the socket channel 20 to the server device 40, where the serialized stock information can be deserialized, updated and sent back over the socket channel 20 to be displayed on the web page 60.

Figure 3:
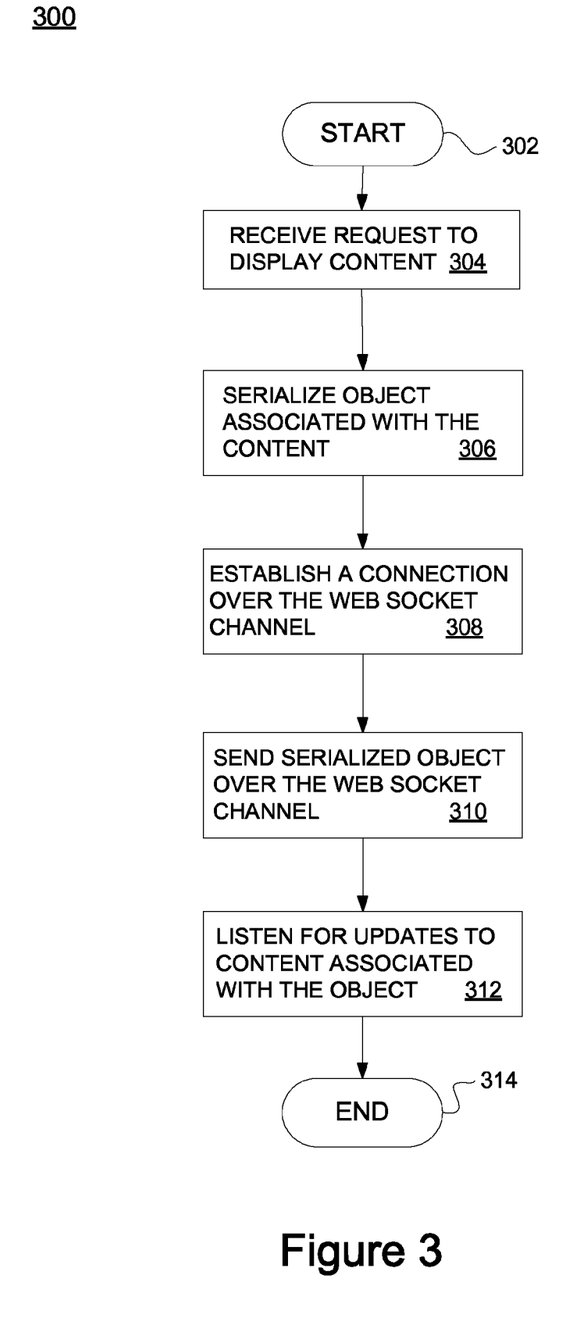
FIG. 3 is a flow chart illustrating an exemplary computer-implemented method that describes the steps performed by the client device 10 shown in FIG. 1.

FIG. 3 is a flow chart illustrating an exemplary computer-implemented method 300 that describes the steps performed by the client device 10 shown in FIG. 1. A request to display content can be received at block 304. The request can be received as a result of a user clicking on a web page link that is associated with the content. In response to receiving such a request, script-based code 35 can instantiate an object associated with the content and use methods within the object to access one or more sources, e.g., database 50, to retrieve the content to be displayed on the web page. The object can be serialized at block 306. In one embodiment, a script-based library can perform the serialization to convert the object into its Unicode representation as previously described. A connection between devices can be established or initialized at block 308. For example, initialization can involve opening a socket channel from the client device 10 to the server device 40 by referencing a uniform resource locator that corresponds to an address configured at the server 40 for receiving content over a socket channel. The serialized object can be sent over a socket channel to a destination at block 310.

Figure 5:
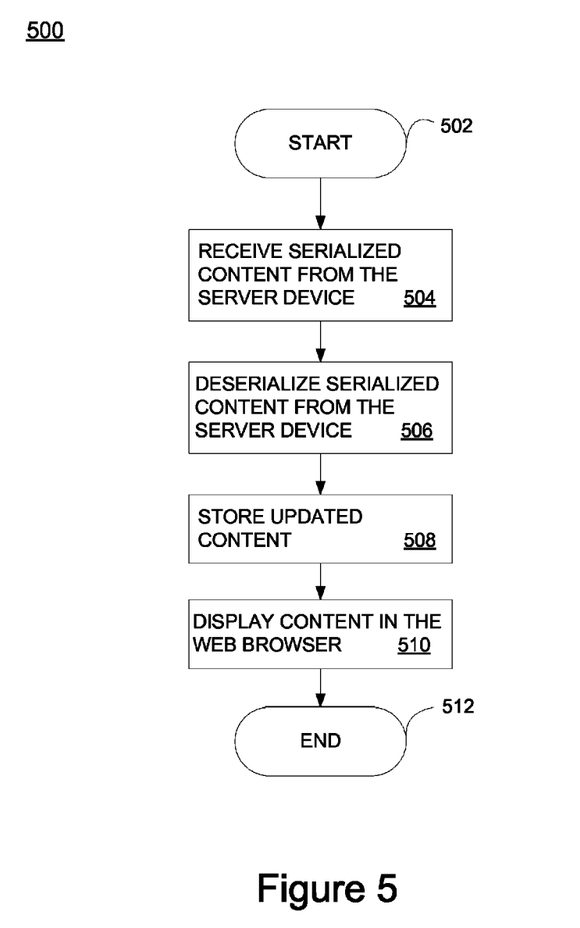
FIG. 5 is a flow chart illustrating an exemplary computer-implemented method that describes the steps performed by the client device 10 upon receiving serialized content from the server device 40.

To send the serialized content, in one embodiment, the communications manager 38 can call a function within the socket API 31 so that the socket channel receives the serialized content and sends it over the socket channel to the server device 40. The communication manager library 38 can also listen for updates to the object at block 312 and process the updates (as shown in FIG. 5). The communication manager library 38 can perform a number of other functions related to the distribution of objects over the socket channel. For example, if communication manager 38 detects that a web browser on the client device 10 does not support the socket protocol, it can issue an error message and attempt to connect to a device using another communication protocol available to it based on selection from a user or according to a pre-defined list of available protocols or channels, for example.

As a specific example, the script-based code 35, the serializer 37, and the communications manager 38 can be JavaScript program code. Also, the socket channel 20 can be a Websocket channel. Thus, a specific example involves JavaScript program code serializing content such as a JavaScript object in a Unicode representation of AMF, and sending the serialized content over a Websocket channel.

Figure 4:
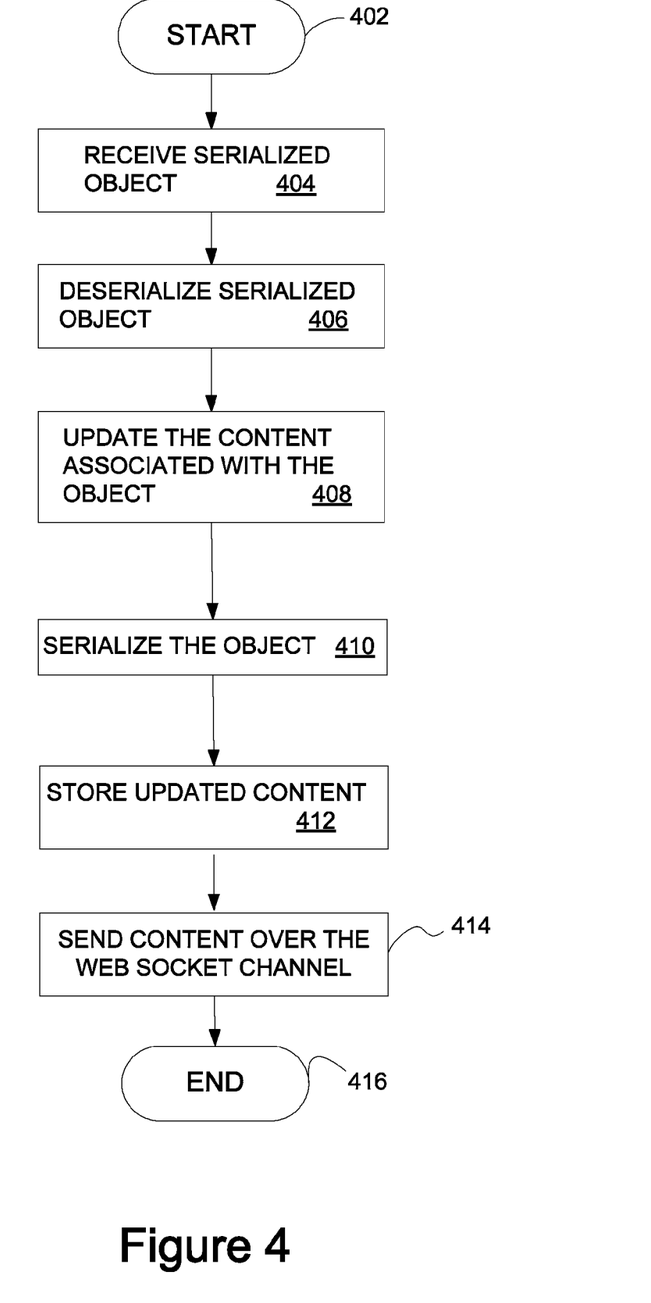
FIG. 4 is a flow chart illustrating an exemplary computer-implemented method that describes the steps performed by the server device 40 shown in FIG. 1.

FIG. 4 is a flow chart illustrating an exemplary computer-implemented method that describes the steps performed by the server device 40 shown in FIG. 1. As shown in flow chart 400, a serialized object can be received over a socket channel by a device that has been configured to handle messages distributed over such a channel (block 404). The serialized object can be deserialized at block 406. In one embodiment, a (de)serializer 42 can extract the raw bytes from the string of Unicode characters that represent the AMF serialized content and use the raw bytes to regenerate the original object. The (de)serializer 42 can interpret objects serialized in a format other than AMF in other embodiments.

The content associated with the object can be updated at block 408. In one embodiment, a server can include program code, e.g., Java servlets, that can access one or more content sources to update the object with the most recent information available. The updated object can be serialized at block 410. In one embodiment, the object can be serialized at the server device 40 in the same format, e.g., a string of Unicode characters, in which it was serialized at the client device 10 so that the client device 10 can understand how to deserialize the object. Variations in serialization format performed at the client device 10 and the server device 40 may exist in some embodiments. Such variations can be understood by either device such that neither format prevents the regeneration of a serialized object to its original, unserialized format. The serialized object can be sent over a socket channel at block 414. Other embodiments may not involve updating content sent from a client device but can instead involve sending an original message from a server to the client device.

FIG. 5 is a flow chart illustrating an exemplary computer-implemented method that describes the steps performed by the client device 10 upon receiving serialized content from the server device 40. As shown, the serialized object can be received at block 504 and deserialized at block 506. In one implementation, the (de)serializer 37 at the client device 10 can deserialize the Unicode characters representing the object to arrive at the original, unformatted object. Unlike the (de)serializer 42, the (de)serializer 37 may not need to obtain raw bytes from the serialized string representation to deserialize the object because it is programmatically capable of converting directly from strings to objects, according to one embodiment. Updated content associated with the deserialized object can be stored in the database 50 or in a cookie on the client device 10, as examples, at block 508. The updated content can be displayed on a web page at block 510.

GENERAL

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, bytes, data, content, values, variables, strings, characters, terms, elements or the like. It should be understood, however, that all of these and similar terms are to be associated with appropriate physical quantities and are merely convenient labels. Unless specifically stated otherwise, it is appreciated that throughout this specification discussions utilizing terms such as "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The methods discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Headings, lists, and numbering included herein are for ease of explanation only and are not meant to be limiting. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method comprising:
    serializing an object comprising content displayed on a web page in a web browser on a client device;
    establishing a connection between the client device and a server device, wherein the connection is a full duplex communication channel for communication between the client device and the server device;
    sending, from the client device, the serialized object over the full duplex communication channel to the server device;
    receiving, at the client device, another serialized object from the server device, the another serialized object comprising updated content associated with the object; and
    deserializing, at the client device, the updated content of the another serialized object received from the server device;
    wherein the serializing, establishing, sending, receiving, and deserializing are performed using one or more script-based libraries, wherein the script-based libraries are accessible by script-based code defining the web page and displaying the content of the object and the updated content on the web page, and wherein the script-based libraries are configured to serialize and send only the updated content.

2. The method of claim 1 wherein:
    the serialization comprises identifying a string representing raw bytes that identify the object, the raw bytes serialized in ActionScript Message Format; and
    the full duplex communication channel is a WebSocket channel.

3. The method of claim 2 wherein the script-based code defining the web page and the script-based libraries are created using the JavaScript programming language.

4. The method of claim 2 wherein the string representing raw bytes is a string of Unicode characters, each of the Unicode characters corresponding to a byte of the object.

5. The method of claim 2 further comprising, in response to the WebSocket channel being unavailable, connecting to the server device using a different channel based on a predefined list of available channels.

6. The method of claim 1 wherein the another serialized object received from the server device comprises different content from the content in the serialized object that was sent to the server device, the script-based code displaying the different content on a portion of the web page.

7. A system comprising:
    a client device comprising a web browser configured to display a web page including script-based code defining the web page;
    one or more script-based libraries installed on the client device, the script-based libraries being executable by the script-based code to:
        serialize an object, the object comprising content displayed on the web page;
        establish a connection between the client device and a server device, wherein the connection is a full duplex communication channel for communication between the client device and the server device;
        send the serialized object over the full duplex communication channel;
        receive another serialized object comprising other content; and
        deserialize the another serialized object; and
    an application configured to:
        display the other content on a portion of the web page; and
        serialize and send only the other content.

8. The system of claim 7 wherein:
    the serialization comprises identifying a string representing raw bytes that identify the object, the raw bytes serialized in ActionScript Message Format; and
    the full duplex communication channel is a WebSocket channel.

9. The system of claim 8 wherein the script-based code defining the web page and the script-based libraries are created using the JavaScript programming language.

10. The system of claim 8 wherein the string representing raw bytes is a string of Unicode characters, each of the Unicode characters corresponding to a byte of the object.

11. The system of claim 8 wherein, in response to the WebSocket channel being unavailable, the script-based libraries establish the connection using a different channel based on a predefined list of available channels.

12. The system of claim 7, wherein:
the application that displays the other content on the web page is installed on the client device; and
the other content comprises updated content associated with the object.

13. The system of claim 7 wherein the another serialized object contains different content from the content in the serialized object.

14. A method comprising:
receiving, at a server device, a request to establish a connection from a client device, wherein the connection is a full duplex communication channel for communication between the server device and the client device;
receiving, at the server device, a serialized object, wherein the serialized object comprises content of a web page, the serialized object having been serialized by script-based code on the client device;
deserializing the serialized object at the server device;
serializing another object at the server device, the another serialized object comprising updated content associated with the object, wherein the script-based code on the client device is configured to serialize and send only the updated content; and
sending, from the server device, the serialized another object over the full duplex communication channel to the client device.

15. The method of claim 14 wherein:
the deserializing comprises extracting raw bytes from a string of Unicode characters that represent the serialized object;
the string of Unicode characters was identified by the script-based code as corresponding to the raw bytes; and
the raw bytes are serialized in ActionScript Message Format.

16. The method of claim 15 wherein the deserializing further comprises converting the raw bytes to the object in its original, deserialized form.

17. The method of claim 14 wherein the request to establish the connection is received from the script-based code.

18. The method of claim 14 wherein:
the full duplex communication channel is a WebSocket channel; and
the script-based code is JavaScript.

19. The method of claim 14 further comprising updating content in the object, wherein the content is displayable on a portion of the web page in a web browser on the client device.

20. The method of claim 14 wherein the sending of the serialized content is initiated by the server device, the sending occurring as a result of the server device identifying that new content associated with the serialized object is available.

* * * * *